United States Patent Office 3,786,102
Patented Jan. 15, 1974

3,786,102
TRANSVINYLATION CATALYST
John J. Godfrey, Murrysville, Pa., assignor to W. R. Grace & Co., New York, N.Y.
No Drawing. Continuation-in-part of abandoned application Ser. No. 883,241, Dec. 9, 1969. This application Aug. 9, 1971, Ser. No. 170,295
Int. Cl. C07c 41/00, 41/10
U.S. Cl. 260—615 R          6 Claims

ABSTRACT OF THE DISCLOSURE

A transvinylation catalyst consisting essentially of a mercury(II) salt of a strongly acidic sulfonated hydrocarbon ion exchange resin and an effective amount of a sterically hindered tertiary amine. A process for preparing a first vinyl ether comprising contacting a second vinyl ether and an alcohol or phenol with said catalyst.

CROSS REFERENCE TO RELATED APPLICATION

This is a continuation-in-part of copending application Ser. No. 883,241, filed Dec. 9, 1969, and now abandoned.

BACKGROUND OF THE INVENTION

This invention comprises: (1) an improved mercury (II) catalyst useful for preparing vinyl ethers by a vinyl transetherification process; and (2) a process for using said catalyst for the preparation of vinyl esters.

Prior art mercury(II) transetherification catalysts and methods for using such catalysts are taught by the following U.S. patents:

3,019,231 (Peppel et al., 260/307)
2,760,990 (Watanabe et al., 260/614)
2,579,412 (Adelman, 260/614)

Ion exchange resins—including strongly acidic (strong-acid) sulfonated ion exchange resins—are well known to those skilled in the art. Details concerning ion exchange resins are reported in: (1) Arnold Weissberger (editor), "Technique of Organic Chemistry," vol. 10, Interscience Publishers, Inc., New York, N.Y., 1957, pp. 285–317; (2) Olof Samuelson, "Ion Exchangers in Analytical Chemistry," John Wiley & Sons, Inc., New York, N.Y., 1953; (3) Kirk-Othmer, "Encyclopedia of Chemical Technology," 2nd edition, John Wiley & Sons, Inc., New York, N.Y., vol. 11, 1966, pp. 871–899; (4) F. C. Nachod and Jack Schubert, "Ion Exchange Technology," Academic Press, Inc., New York, N.Y., 1956; (5) Rohm and Haas Company, "Amberlyst 15, Synthetic Resin Catalyst," Philadelphia, Pa., 1962 (revised 1965); (6) Arnold Weissberger (editor), "Technique of Organic Chemistry," vol. 2, Interscience Publishers, Inc., New York, N.Y., 1956, pp. 251–252; and (7) The Dow Chemical Company, "Dowex Ion Exchange," Midland, Mich., 1958.

Procedures for preparing sulfonated hydrocarbon resins are well known to those skilled in the art. For example, such procedures are taught; (a) on page 297 of vol. 19 of the above-mentioned Kirk-Othmer Encyclopedia; (b) in vol. 7 of "Encyclopedia of Polymer Science and Technology" which is mentioned infra; and (c) in the chapter by G. D. Jones in "Styrene, Its Polymers, Copolymers, and Derivatives," T. H. Boundy and R. F. Boyer (editors), Reinhold Publishing Corporation, New York, N.Y., 1952. Strongly acidic polyolefin resins can be prepared by polymerizing an olefinically unsaturated sulfonic acid such as vinyl sulfonic acid or the like.

SUMMARY OF THE INVENTION

In summary this invention is directed to a composition consisting essentially of a mercury(II) salt of a strongly acidic sulfonated hydrocarbon ion exchange resin and an effective amount of a sterically hindered tertiary amine. Said composition is useful as a catalyst for transetherification reactions—especially transetherification reactions wherein a first vinyl ether is formed by reacting a second vinyl ether with an alcohol or phenol.

DESCRIPTION OF PREFERRED EMBODIMENTS

In preferred embodiments of the composition of the above summary:

(1) The strongly acidic sulfonated hydrocarbon ion exchange resin is a sulfonated copolymer of styrene and divinylbenzene.

(2) The strongly acidic sulfonated hydrocarbon ion exchange resin is sulfonated polyethylene or sulfonated polypropylene.

(3) The sterically hindered tertiary amine is a member selected from the group consisting of 2,6-lutidine, 2,6-diethylpyridine, 2-methyl-6-ethylpyridine, or a mixture of at least 2 members of said group.

(4) The sterically hindered tertiary amine is 2,6-lutidine.

In another preferred embodiment (Embodiment A) this invention is directed to an improvement in a process for forming a first vinyl ether (a product vinyl ether) comprising reacting in the presence of a mercury salt of a strong acid a second vinyl ether (a reactant vinyl ether) have the formula

$$CH_2=CH-O-R$$

where R is an organic radical other than vinyl having not more than 50 carbon atoms and having a carbon atom attached to the ether oxygen, with an organic hydroxy compound having from 1 to about 3 hydroxyl groups selected from the group consisting of alcoholic and phenolic hydroxyl groups and having not more than about 1000 carbon atoms, said hydroxyl groups being attached to a radical different than the radical R of said second vinyl ether, said second vinyl ether and said hydroxy compound being in the liquid state, said improvement comprising conducting the reaction in the presence of a catalyst consisting essentially of a mercury(II) salt of a strongly acidic sulfonated hydrocarbon ion exchange resin and an effective amount of a sterically hindered tertiary amine and at a temperature above 10° C. and below the softening point of the catalyst.

Temperatures below 10° C. are operable, but I prefer to avoid such temperatures because of the cost of cooling apparatus required to maintain such temperatures. A preferred operating temperature range is about 15–140° C., other preferred temperature ranges are 10–80° C., 18–65° C., and an especially preferred range is about 20–50° C. However, it is important that any operating temperature be below the softening point of the particular catalyst used. The softening point of a catalyst is the temperature at which the catalyst where pressed on a heated metal block will soften and stick.

Where using a system in which at least one of the components (a reactant or a product); (a) is a gas or a vapor at ordinary pressure; or (b) has a high vapor pressure (e.g., a vapor pressure in excess of about 50–100 mm. of mercury) at the operating temperature a pressurized reactor can be used, but the use of pressurized apparatus is expensive and thus generally undesirable. A closed system without special construction to withstand high pressure is excellently adapted for working with materials (reactants and products) having low vapor pressures (e.g., less than about 50–100 mm. of mercury).

Where working with a system in which at least one component (a reactant or product) or a mixture of components is a solid at the reaction temperature a solvent must be added to place the system in a liquid state. Solvents which are suitable for the reaction are materials which are substantially chemically inert to the reactants and products and which will exist as liquids at the reaction temperature. Such solvents include decahydronaphthalene, xylene, benzene, heptane, and polar solvents (e.g., methylpyrrolidone, furan, or tetrahydrofuran) that are free of reactive groups such as alcohol, ester, aldehyde, and ketone groups which would inhibit or interfere with the transvinylation and the solvents listed in lines 57–66 of column 3 of above-mentioned Pat. No. 2,579,412 (Adelman). Pressure can be applied if the solvent would boil (or would have an appreciable vapor pressure) at the reaction temperature. It is preferred to avoid the use of a solvent where possible, and the best results are obtained where the vinyl ethers and hydroxy compounds dissolve one another to form a homogeneous liquid at the reaction temperature.

In preferred embodiments of the process of Embodiment A, supra:

(1) The strongly acidic sulfonated hydrocarbon ion exchange resin is a sulfonated copolymer of styrene and divinylbenzene (preferably about 0.5–18% of the divinylbenzene moiety).

(2) The strongly acidic sulfonated hydrocarbon ion exchange resin is sulfonated polyethylene or sulfonated polypropylene.

(3) The sterically hindered tertiary amine is a member selected from the group consisting of 2,6-lutidine, 2,6-diethylpyridine, 2-methyl-6-ethylpyridine, or a mixture of at least 2 members of said group.

(4) The sterically hindered tertiary amine is 2,6-lutidine.

Various other strongly acidic sulfonated hydrocarbon ion exchange resins which will give excellent results where used in the compositions and processes of my invention will because of my disclosure be readily apparent to those skilled in the art. Such resins include sulfonated polystyrene, sulfonated polybutadiene, sulfonated polybutylene, and the like.

Because of my disclosure various other sterically hindered tertiary amines which can be used with excellent results in the compositions and processes of my invention will be readily apparent to those skilled in the art; such amines include 2-methyl-6-n-propylpyridine, 2-methyl-6-iso-propylpyridine, and the like.

DETAILED DESCRIPTION OF THE INVENTION

This invention is directed to a composition of matter useful as a catalyst for a transvinylation reaction and to a method of transvinylation. This invention is also directed to a method for preparing vinyl ethers by a process wherein a liquid mixture of a reactant vinyl ether and a reactant alcohol or phenol is contacted with said composition to form a liquid mixture of a product vinyl ether, a by-product alcohol or phenol, and any unreacted portions of the aforesaid reactant vinyl ether and the aforesaid reactant alcohol or phenol.

If desired, an inert solvent can be included in or added to the mixture of the reactant alcohol (or phenol) and the reactant vinyl ether. Obviously, if the mixture of the aforesaid reactant vinyl ether and the aforesaid reactant alcohol (or phenol) is not completely liquid, an inert solvent must be added to render the system completely liquid (i.e., free from solid phase).

Also, if desired, such inert solvent can be added even though the mixture of the reactant alcohol (or phenol) and the reactant vinyl ether is completely liquid before adding such inert solvent. However, I generally do not add an inert solvent unless; (a) there is a solid phase present in the mixture obtained when the reactant vinyl ether and the reactant alcohol (or phenol) are mixed; or (b) a solid phase is present in the product in which instance an inert solvent is used to dissolve the solid.

The composition of this invention consists essentially of a solid mercury(II) salt of a strongly acidic sulfonated hydrocarbon ion exchange resin and an effective amount of a sterically hindered tertiary amine.

The process of the instant invention is characterized by the use of a mercury(II) salt of a strongly acidic sulfonated hydrocarbon ion exchange resin and an effective amount of said sterically hindered tertiary amine as catalyst. By strongly acidic, I mean that in the acid form the resin has a $pK_a$ of about 1 or less.

I have made the surprising discovery that a mercury(II) salt of a strongly acidic hydrocarbon ion exchange resin (i.e., a mercury(II) salt of a sulfonated hydrocarbonated ion exchange resin) will not function properly as a catalyst for transvinylation except in the presence of a sterically hindered tertiary amine such as 2,6-lutidine, 2,6-diethylpyridine, 2-methyl - 6 - ethylpyridine, or the like. These operable compounds have a property in common, namely they are sterically hindered amines. When attempting to conduct the transvinylation without such tertiary amine being present, I have failed to obtain detectable quantities of the desired vinyl ether product. On the contrary, the catalyst and the reaction mixture became hot, and undesirable side reactions occurred, but the desired vinyl ether product was not formed. When I attempted to use a non-sterically hindered amine such as triethylamine or trimethylamine, no reaction occurred. Accordingly, it is critical that such tertiary amine (e.g., 2,6-lutidine, 2,6-diethylpyridine, 2-methyl-6-ethylpyridine, or the like) be present in intimate contact with the solid mercury(II) salt. I have found that the exact quantity of such tertiary amine is not critical, and, on the basis of my disclosure, one skilled in the art can readily determine what quantity of the amine constitutes an effective amount.

By effective amount, I mean that quantity of the amine which will prevent the above-mentioned side reactions from occurring and which will produce the desired transvinylation product (vinyl ether).

While it is possible to conduct the process of this invention by contacting the liquid reactant mixture and particles of the solid catalyst by stirring them together in a reaction vessel or reaction zone and then separating the liquid from the solid catalyst and recovering the product vinyl ether from the separated liquid, I prefer to conduct the process of my invention by placing the solid catalyst in particulate form in a column, passing the liquid reaction mixture through the column, removing the liquid product mixture from the column, and separating and recovering the product vinyl ether. Residence (contact) time is not critical and a preferred residence time which will produce an optimum conversion (one pass yield) can readily be determined for a particular system. Economic rather than technical factors generally govern contact time.

The following specific examples further illustrate the process of my invention but do not limit the scope of my claims.

EXAMPLE I

Preparation of mercury(II) salt of resin

A strongly acidic sulfonated resin (a copolymer of styrene and divinylbenzene) in the form of small beads was placed in a beaker and treated with a mixture of ice and an aqueous solution of sodium hydroxide (5% by weight sodium hydroxide), using an excess over the stoichiometric amount of sodium hydroxide to convert the resin to its sodium form. The resulting sodium salt of the resin was placed in a large buret and washed with distilled water until the effluent was neutral to litmus paper. A dilute aqueous solution of mercury(II) acetate which was free of precipitate was passed through the bed of the sodium salt of the resin in the buret. A small (ca., 10%) excess of mercury(II) acetate over that required by the stoichiometry—the resin, before neutralization, having been found to have 4.9 milliequivalents of hydrogen per gram of dry resin—was used. This treatment converted the resin into the mercury(II) salt of the sulfonic acid of the resin. The resulting mercury(II) salt of the sulfonic acid was washed with several bed volumes of distilled water to remove substantially all of the excess mercury(II) acetate. Following this treatment, the bed of mercury(II) salt of the resin was washed with ethylene glycol dimethyl ether to remove residual water therefrom. The resulting substantially water free mercury(II) salt of the sulfonated polystyrene was labeled "Mercury(II) Salt No. 1."

The above general procedure was repeated but in this instance it was modified by replacing the strongly acidic sulfonated styrene divinylbenzene resin with strongly acidic sulfonated polystyrene. The resulting mercury salt was labeled "Mercury(II) Salt No. 2."

The above general procedure was repeated; however, in this instance the resin used was a commercially available strongly acid resin sold by Rohm and Haas Company under the name Amberlyst 15. The resulting mercury(II) salt was labeled "Mercury(II) Salt No. 3."

Another mercury(II) salt was prepared from a strongly acidic sulfonated polyethylene resin by the above-mentioned procedure. This mercury(II) salt was labeled "Mercury(II) Salt No. 4."

EXAMPLE II

A 20 ml. portion of Mercury(II) Salt No. 1 was placed in a 25 ml. buret. About 3 grams of 2,6-lutidine in 20 ml. of ethylene glycol dimethyl ether was passed through the catalyst bed (i.e., the bed of Mercury(II) Salt No. 1).

A mixture of isobutyl vinyl ether and n-octanol (1:1 mole ratio) was passed through the 2,6-lutidine treated catalyst bed and the resulting product mixture was collected. Analysis of the resulting mixture showed that the mole ratio of isobutyl vinyl ether to n-octyl vinyl ether was about 2:1. Residence time in the buret was about 30 minutes, and the catalyst temperature was about 30° C.

The n-octyl vinyl ether product was separated from the product mixture by distillation and recovered.

Results substantially indistinguishable from the above were obtained where:

(1) Mercury(II) Salt No. 1 was replaced with:

(a) Mercury(II) Salt No. 2; (b) Mercury(II) Salt No. 3; and (c) Mercury(II) Salt No. 4.

(2) The 2,6-lutidine was replaced with:

(a) 2,6-diethylpyridine;
(b) 2-methyl-6-ethylpyridine;
(c) 2-methyl-6-n-propylpyridine; and
(d) 2-methyl-6-isopropylpyridine.

A detectable quantity of n-octyl vinyl ether was not obtained where the pyridine, 2,4-lutidine, or 3,4-lutidine was used in place of the 2,6-lutidine.

EXAMPLE III

The general procedure of Example II was repeated; however, in this instance the Mercury(II) Salt No. 1 was not treated with 2,6-lutidine before bringing the reactant mixture of isobutyl vinyl ether and n-octanol into contact with said Mercury(II) salt. The catalyst bed became hot almost as soon as it was contacted with the reactant mixture. No detectable quantity of n-octyl vinyl ether was formed.

Substantially identical results were obtained where the Mercury(II) Salt No. 1 was replaced with: (a) Mercury(II) Salt No. 2; (b) Mercury(II) Salt No. 3; and (c) Mercury(II) Salt No. 4.

EXAMPLE IV

The general procedure of Example II was repeated; however, in this instance the catalyst bed was treated with a solution of 1.5 grams trimethylamine in 20 ml. ethylene glycol dimethyl ether (rather than a solution of 2,6-lutidine in said ether) using about 1 gram of the amine in 20 ml. of the ether. Although in this instance the catalyst did not become hot when contacted with the isobutyl vinyl ether-n-octanol mixture, no detectable quantity of n-octyl vinyl ether was formed.

Substantially identical results were obtained where the Mercury(II) Salt No. 1 was replaced with: (a) Mercury(II) Salt No. 2; (b) Mercury(II) Salt No. 3; and (c) Mercury(II) Salt No. 4.

EXAMPLE V

The general procedure of Example II was repeated; however, in this instance ethylene glycol was used in place of the n-octanol and the mole ratio of isobutyl vinyl ether to ethylene glycol was about 4:1. Tetrahydrofuran was used as solvent. A substantial yield of divinyl ether of ethylene glycol was obtained. A small quantity of the monovinyl ether of ethylene glycol was also present in the product. The product divinyl ether of ethylene glycol was separated from the product mixture by distillation and recovered.

Substantially identical results were obtained where the Mercury(II) Salt No. 1 was replaced with: (a) Mercury(II) Salt No. 2; (b) Mercury(II) Salt No. 3; and (c) Mercury(II) Salt No. 4.

EXAMPLE VI

The general procedure of Example II was repeated; however, in this instance pentyl vinyl ether was used in place of isobutyl vinyl ether. The yield of n-octyl vinyl ether was substantially identical to that obtained in Example II.

Substantially identical results were obtained where the Mercury(II) Salt No. 1 was replaced with: (a) Mercury(II) Salt No. 2; (b) Mercury(II) Salt No. 3; and (c) Mercury(II) Salt No. 4.

In other runs using the general procedure of Example V wherein the glycol was replaced with glycerol, a triol, excellent results were obtained.

In still other runs, using the general procedure of Example V, excellent results were obtained where the ethylene glycol of said Example V was replaced with polyethylene glycols having the formula $$HOCH_2CH_2(OCH_2CH_2)_nOH$$

where $n$ is an integer of from 1 to about 200 and propylene glycols having the formula $$HO(C_3H_6O)_nC_3H_6OH$$

where $n$ is an integer of from 1 to about 200.

Other vinyl ethers which can be made by the general procedure of Example II are those having the formula $$CH_2=CHOR$$

where R is any organic radical other than vinyl which contains not more than about 1000 carbon atoms and has a carbon atom attached to the ether oxygen. The radical R of the above formula can be an unsubstituted hydrocarbon as alkyl or phenyl or it can contain various functional groups such as unsaturated carbon-carbon bonds, hydroxyl, halogen, amide, or nitrile groups.

EXAMPLE VII

Three runs were made repeating the general procedure of Example I. However, said procedure was modified by replacing the sulfonated copolymer of styrene and divinylbenzene with the following commercially available strongly acidic sulfonated hydrocarbon resins:

Run 7–A: Permutit Q (a sulfonated polystyrene resin).
Run 7–B: Amberlite IR–120 (a nuclear sulfonated hydrocarbon resin).
Run 7–C: Dowex 50–X4 (a sulfonated styrene-divinylbenzene copolymer containing ca. 4% divinylbenzene).

The following table shows the designation assigned to each of the above-prepared mercury(II) salts of strongly acidic sulfonated hydrocarbon resins:

| Run No.: | Designation assigned mercury(II) salt |
|---|---|
| 7-A | Mercury(II) Salt A |
| 7-B | Mercury(II) Salt B |
| 7-C | Mercury(II) Salt C |

EXAMPLE VIII

Three runs were made using the general procedure of Example II, but each was modified by replacing Mercury(II) Salt No. 1 with one of the mercury(II) salts prepared in Example VII, supra.

| Run No.: | Mercury(II) salt used |
|---|---|
| 8-A | Mercury(II) Salt A |
| 8-B | Mercury(II) Salt B |
| 8-C | Mercury(II) Salt C |

The result obtained in each of these runs was substantially identical with that obtained in Example II, supra.

Examples of vinyl ethers excellently adapted for use in reactants in the process of my invention include vinyl ethyl ether, vinyl butyl ether, vinyl isobutyl ether, vinyl phenyl ether, the divinyl ether of ethylene glycol, the vinyl ether of ethylene glycol monoethyl ether, the vinyl ether of diethylene glycol monomethyl ether, and the like.

Organic hydroxy compounds excellently adapted for use as reactants in practicing my invention are those which have not more than three hydroxyl groups and not more than about 1000 carbon atoms in each molecule. Hydroxy compounds containing five or six hydroxyl groups on adjacent carbon atoms (e.g., glucose) are substantially insoluble, and unreactive with the vinyl ethers under the conditions described hereinabove. While the hydroxy compounds containing four or more hydroxyl groups spaced sufficiently far apart in the molecule can react under the herein described conditions with the vinyl ether, such polyhydroxy compounds generally react very slowly and I prefer, therefore, to utilize as reactant hydroxy compounds containing not more than three hydroxyl groups in the molecule.

Hydroxy compounds excellently adapted for practicing the present invention are of the type R—OH, where R is an aliphatic, aromatic, or heterocyclic group, a carbon atom of which is attached to the hydroxyl oxygen. The hydroxy compound also may contain other functional groups, such as unsaturated carbon-carbon bonds, hydroxyl, halogen, amide, or nitrile, and the like. Examples include methanol, ethanol, isopropyl, alcohol, tertiary butyl alcohol, lauryl alcohol, allyl alcohol, crotonyl alcohol, tetrahydrofurfuryl alcohol, ethylene glycol, 1,5-pentanediol, glycerol, ethylene glycol monomethyl ether, diethylene glycol monomethyl ether, diacetone alcohol, glycolic aldehyde, ethylene glycol monoacetate, glycerol diacetate, glycolic acid, methyl glycolate, hydroxy acetamide, hydroxy acetonitrile, acetone cyanohydrin, amino methylols, ethylene cyanohydrin, pentamethylene cyanohydrin, ethylene chlorohydrin, pentamethylene chlorohydrin, polymethylene glycols, polyethylene glycols, phenol, cresol, picric acid, resorcinol, resorcinol monomethyl ether, salicyclic acid, naphthols, and the like.

Other hydroxy compounds excellently adapted for use in the process of my invention include alkanols having about 1-20 carbon atoms, diols having the formula $$HO-R-OH$$

where R is an alkylene (not an alkylidene) group having about 2-40 carbon atoms, triols having the formula $$R_2(OH)_3$$

where $R_2$ is a trivalent (not an alkylidyne) organic radical consisting of carbon and hydrogen and having about 3-40 carbon atoms, polyethylene glycols having the formula $$HOCH_2CH_2(OCH_2CH_2)_nOH$$

where $n$ is an integer of from about 1 to 200 polypropylene glycols having the formula $$HO(C_3H_6O)_nC_3H_6OH$$

where $n$ is an integer from about 1 to 200 and dihydroxyl terminated telechelic polymers having a molecular weight of less than about 10,000. Typical of such dihydroxyl terminated telechelic polymers are dihydroxyl terminated polybutadienes having a molecular weight of less than about 10,000, dihydroxyl terminated copolymers of butadiene and acrylonitrile having molecular weights less than about 10,000, dihydroxyl terminated copolymers of butadiene and styrene having a molecular weight of less than about 10,000, and dihydroxyl terminated polyesters having a molecular weight of less than about 10,000. Other telechelic polymers having molecular weights less than about 10,000 will be readily apparent to those skilled in the art. Preferred molecular weights for such polymers are about 500–5,000. Dihydroxyl terminated telechelic polymers are well known to all who are skilled in the art—see; (a) pages 574–575 of vol. 13 of "Encyclopedia of Polymer Science and Technology," Herman F. Mark, Chairman of the Editorial Board, John Wiley & Sons, Inc., New York, N.Y., 1970; and (b) C. A. Uraneck, J. Polymer Sci., 1960, 46, 535–539 (C.A. 1961, 55, 19309f).

Typical of the first vinyl ethers (product vinyl ethers) which have been prepared or which can be prepared by the process of my invention are vinyl alkyl ethers having about 3-20 carbon atoms, vinyl ethers having the formulas $$HO-R_1OCH=CH_2 \text{ and } CH_2=CHO-R_1OCH=CH_2$$

where $R_1$ is a divalent (not an alkylidene) group having about 2-40 carbon atoms, vinyl ethers having the formula $$(HO)_2R_2OCH=CH_2$$

where $R_2$ is a trivalent (not an alkylidyne) organic group consisting of carbon and hydrogen and having about 3-40 carbon atoms, vinyl ethers having the formula $$HOR_2(OCH=CH_2)_2$$

where $R_2$ is as defined supra, vinyl ethers having the formula $$R_2(OCH=CH_2)_3$$

where $R_2$ is as defined supra, vinyl ethers having the formula $$HOCH_2CH_2(OCH_2CH_2)_nOCH=CH_2$$

where $n$ is about 1-200, vinyl ethers having the formula $$CH_2=CHOCH_2CH_2(OCH_2CH_2)_nOCH=CH_2$$

where $n$ is about 1-200, vinyl ethers having the formula $$HO(C_3H_6O)_nC_3H_6OCH=CH_2$$

where $n$ is an integer from about 1-200, vinyl ethers having the formula $$CH_2=CHO(C_3H_6O)_nC_3H_6OCH=CH_2$$

where $n$ is about 1-200, and mono- and di-vinyl ether terminated polymers formed by the transvinylation of hydroxyl terminated telechelic polymers having a molecular weight of up to about 10,000—preferably about 500–5,000. Typical of such vinyl ethers are those resulting from the mono- or di-vinylation of dihydroxyl terminated telechelic polymers such as dihydroxyl terminated polybutadienes having a molecular weight of up to about 10,000, dihydroxyl terminated copolymers of butadiene and styrene having a molecular weight of up to about 10,000, dihydroxyl terminated polyesters having a molecular weight of up to about 10,000, and the like by the process of the instant invention. Obviously, where such product vinyl ether is a monovinyl ether terminated telechelic polymer, only one of the hydroxyl groups of the dihydroxyl terminated telechelic polymer from which such first monovinyl ether was prepared has been converted to a vinyl ether group. It is also obvious that a divinyl ether will have a molecular weight about 52 molecular weight units higher than that of the dihydroxyl terminated polymer from which it (the divinyl ether) was formed while a monovinyl ether will have a molecular weight about 26 molecular weight units higher than that of the dihydroxyl terminated polymer from which it (the monovinyl ether) was formed.

Vinyl ethers prepared by the process of this invention using the composition of this invention as catalyst are useful as polar comonomers in conventional vinyl copolymer systems to improve dyeability, adhesion, and surface properties. The di- and trivinyl ethers are useful as crosslinking agents in comonomer systems and as chain extenders or crosslinkers when combined with di- or polyfunctional mercaptans. For example, tough coatings are obtained from the reaction of pentaerythritol tetra-beta-mercaptopropionate and a polyoxyalkylene divinyl ether such as polyoxyethylene divinyl ether having the formula

where $n$ is an integer from about 1–200; or

where $n$ is an integer from about 1–200 in the presence of a free radical source.

Vinyl ethers prepared by the process of this invention using the composition of this invention as catalyst are useful for forming copolymers with maleic anhydride and with mixtures of maleic anhydride and styrene. Such copolymers are useful as thickening agents—especially as thickening agents in paint.

Various other uses of vinyl ethers prepared using the composition of this invention as catalyst will be readily apparent to those skilled in the art.

As used herein, the term "an effective amount of a sterically hindered tertiary amine" means that amount, or quantity of said amine which where present in the catalyst composition will cause the above-mentioned transvinylation reaction to occur where the above-mentioned second vinyl ether and the above-mentioned organic hydroxy compound in the liquid state are brought into contact with said catalyst. I generally prefer to have a weight ratio of mercury(II) salt of the strongly acidic sulfonated hydrocarbon ion exchange resin to sterically hindered tertiary amine of about 1:0.05–0.8. However, the exact weight ratio of said salt to said amine is not critical except that an effective amount, as defined supra, must be present.

I claim:
1. In a process which comprises reacting, in the presence of a mercury salt catalyst, a reactant vinyl ether selected from the group consisting of vinyl ethyl ether, vinyl butyl ether, vinyl isobutyl ether, and vinyl pentyl ether with an organic hydroxy compound selected from the group consisting of an alkanol having 1–20 carbon atoms, a diol having the formula HO—R—OH where R is an alkylene group having 2–40 carbon atoms, and glycerol to form a product vinyl ether, the reactant vinyl ether, the organic hydroxy compound, and the product vinyl ether being in the liquid state, the improvement comprising; conducting the reaction at a temperature above 10° C. and below the softening point of the catalyst, the catalyst consisting essentially of a mercury (II) salt of a sulfonated ion exchange resin selected from the group consisting of a sulfonated copolymer of styrene and divinylbenzene, sulfonated polyethylene, sulfonated polypropylene, sulfonated polystyrene, sulfonated polybutadiene, and sulfonated polybutylene, and a sterically hindered tertiary amine selected from the group consisting of 2,6-lutidine, 2,6-diethylpyridine, 2-methyl-6-ethylpyridine, 2-methyl-6-n-propylpyridine, and 2-methyl-6-isopropylpyridine, the weight ratio of mercury(II) salt of the sulfonated ion exchange resin to the sterically hindered tertiary amine being 1:0.05–0.8 to provide an amount of said amine effective for forming the product vinyl ether.

2. The process of claim 1 in which the organic hydroxy compound is ethylene glycol or glycerol.

3. The process of claim 1 in which the organic hydroxy compound is a diol having the formula HO—R—OH in which R is an alkylene group having 2–40 carbon atoms.

4. The process of claim 1 in which the organic hydroxy compound is an alkanol having 1–20 carbon atoms.

5. The process of claim 1 in which the sulfonated ion exchange resin is a sulfonated copolymer of styrene and divinylbenzene or sulfonated polystyrene.

6. The process of claim 1 in which the sterically hindered tertiary amine is 2,6-lutidine.

References Cited
UNITED STATES PATENTS

| | | | |
|---|---|---|---|
| 3,576,884 | 4/1971 | Russell | 260—614 R X |
| 2,579,412 | 12/1951 | Adelman | 260—614 R |
| 2,760,990 | 8/1956 | Watanabe et al. | 260—614 R |
| 2,847,477 | 8/1958 | Watanabe et al. | 260—614 R X |
| 2,922,822 | 1/1960 | Beach | 260—614 R |
| 3,250,813 | 5/1966 | Stephenson | 260—614 R |
| 3,250,814 | 5/1966 | Stephenson | 260—615 R |

HOWARD T. MARS, Primary Examiner

U.S. Cl. X.R.

250—431 N; 260—346.1 R, 465.6, 491, 496, 519, 533 R, 551 R, 584 C, 602, 612 D, 614 R